United States Patent
Mao et al.

(10) Patent No.: US 8,260,824 B2
(45) Date of Patent: Sep. 4, 2012

(54) OBJECT-RELATIONAL BASED DATA ACCESS FOR NESTED RELATIONAL AND HIERARCHICAL DATABASES

(75) Inventors: Jianfeng Mao, Denver, CO (US); Steven C. Wingfield, Denver, CO (US)

(73) Assignee: Rocket Software, Inc., Waltham, MA (US)

( * ) Notice: Subject to any disclaimer, the term of this patent is extended or adjusted under 35 U.S.C. 154(b) by 579 days.

(21) Appl. No.: 12/435,654

(22) Filed: May 5, 2009

(65) Prior Publication Data

US 2010/0287208 A1 Nov. 11, 2010

(51) Int. Cl.
*G06F 17/20* (2006.01)
*G06F 15/16* (2006.01)
(52) U.S. Cl. .................. 707/803; 707/756; 707/955
(58) Field of Classification Search .................. 707/803, 707/955, 756
See application file for complete search history.

(56) References Cited

U.S. PATENT DOCUMENTS

| | | |
|---|---|---|
| 9,995,662 | 2/2006 | Mullins |
| 8,327,362 | 6/2008 | Wang et al. |
| 2002/0069157 A1 | 6/2002 | Jordan |
| 2007/0027907 A1 | 2/2007 | Kulkarni et al. |
| 2008/0301087 A1* | 12/2008 | Bernard ............................ 707/2 |

OTHER PUBLICATIONS

"5. Object Relational Mapping (GORM)", http://docs.huihoo.com/grails/1.0.3/guide/5.%20Object%20Relational%20Mapping%20(GORM).html, retrieved on Dec. 12, 2008, 25 pages.
"Nested Relational Databases White Paper", IBM Corporation, IBM U2, Nov. 2001, ftp://ftp.software.ibm.com/software/data/u2/pubs/whitepapers/nested_rdbms.pdf, pp. 1-16.
Atwood, Jeff, "Coding Horror, programming and human factors", Jul. 14, 2008, http://www.codinghorror.com/blog/archives/001152.html, retrieved on Dec. 12, 2008, 4 pages.
Oswald, Janet et al., "IBM U2: The big picture", IBM Corporation, Aug. 18, 2005, http://www.ibm.com/developerworks/data/library/techarticle/dm-0508oswald/, 7 pages.

* cited by examiner

*Primary Examiner* — John E Breene
*Assistant Examiner* — Alex Gofman
(74) *Attorney, Agent, or Firm* — Stephen J. Walder, Jr.

(57) ABSTRACT

Mechanisms are provided for mapping objects and object-relationships in an object-oriented programming language to a nested relational database. Entity metadata constructs for an object relational mapping framework are obtained, the entity metadata constructs mapping fields in entities of an object model to fields in a data table of the nested relational database and identifying relationships between entities in the object model. A nested relational data model of the nested relational database is obtained, the nested relational data model specifying tables and sub-tables of the nested relational database. Tables and sub-tables of the nested relational database are mapped to a plurality of separate entities of the object model. Data in the nested relational database is accessed using the plurality of separate entities. The mapping is performed without normalizing the data of the tables and sub-tables of the nested relational database to a non-nested representation.

18 Claims, 6 Drawing Sheets

OBJECT-RELATIONAL BASED DATA ACCESS FOR NESTED RELATIONAL AND HIERARCHICAL DATABASES

BACKGROUND

The present application relates generally to an improved data processing mechanism and more specifically to a mechanism for object-relational mapping (ORM) based data access for nested relational and hierarchical databases.

Database developers and application developers model business processes and data differently. Database developers typically view and represent data and business processes in terms of a relational model. Application developers typically view and represent data and business processes in terms of object oriented programming constructs. The mismatch between the views and representations of data and business processes by the database developers and the application developers is addressed by the use of object-relational mapping data access technologies. Examples of such ORM based data access technologies include Hibernate available as an open source project from www.hibernate.org, Java Persistence API (JPA) as specified in the Enterprise JavaBeans 3.0 specification, and Microsoft .NET Entity Framework available from Microsoft Corporation.

Hibernate, JPA, the .NET Entity Framework, and other ORM's typically define a set of metadata, in the form of code annotations, Extensible Markup Language (XML) mapping schemas or Document Type Definitions (DTDs), or other mechanisms, to map objects in object oriented programming languages to data stored in relational databases, thus making instances of such classes persistable. These persistable classes are commonly referred to as "entities" in ORM parlance.

With a proper ORM configuration, an application is freed from the low level details of database interaction, and instead deals directly only with entities. Much of the details of actually persisting these entities are hidden from the application and taken care of by the ORM frameworks, i.e., "entity providers."

ORM technologies are gaining wide-spread acceptance in the industry. However, they focus mainly on traditional relational databases. Most, if not all, entity providers assume that there is standard Structured Query Language (SQL) support in the database.

Nested relational databases (also known as extended relational databases, or multi-value databases) differ from traditional relational databases in that they do not require adherence to the First Normal Form (1NF). Thus, table cells in a nested relational database can contain sets of values, rather than being restricted to atomic values. This allows tables to be nested within other tables in the nested relational data model. Hierarchical databases store their data in tree structures with parent nodes owning one or more child nodes. Because of these core differences from traditional relational databases, SQL is not the primary data access mechanism for these types of databases.

Thus, the known ORM technologies do not operate on nested relational or hierarchical databases in a native manner that caters to the respective strengths of these data models.

SUMMARY

In one illustrative embodiment, a method, in a data processing system, is provided for mapping objects and object-relationships in an object-oriented programming language to the data stored in a nested relational database. The method comprises obtaining entity metadata constructs for an object relational mapping framework, the entity metadata constructs mapping fields in entities of an object model to fields in a data table of the nested relational database and identifying relationships between entities in the object model. The method further comprises obtaining the nested relational data model of the nested relational database, the nested relational data model specifying tables and sub-tables of the nested relational database. Moreover, the method comprises mapping tables and sub-tables of the nested relational database to a plurality of separate entities of the object model. Furthermore, the method comprises accessing data in the nested relational database using the plurality of separate entities. The mapping is performed without normalizing the data of the tables and sub-tables of the nested relational database to a first normal form representation.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
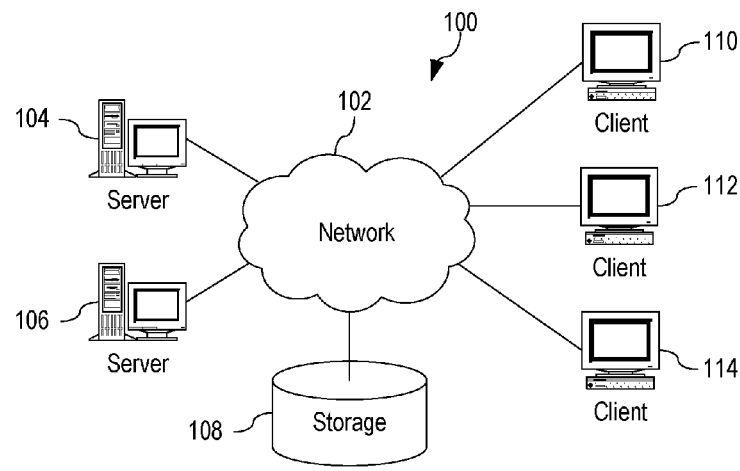
FIG. 1 is an example diagram of a distributed data processing system environment in which exemplary aspects of the illustrative embodiments may be implemented.

The illustrative embodiments provide a mechanism for object-relational mapping (ORM) based data access for nested relational databases, such as IBM UniData and IBM UniVerse available from International Business Machines Corporation, jBASE available from jBASE International, or the like. As noted above, known ORM technologies do not operate on nested relational databases without requiring the use of SQL and normalizing the data to first normal form. The illustrative embodiments provide a non-Structured Query Language (SQL) approach, that does not require first normal form normalization, to make ORM technologies work for nested relational databases while still adhering to standard ORM technology specifications, such as, but not limited to, the JPA and .NET Entity Framework specifications. In other words, the illustrative embodiments apply the mapping metadata defined in the ORM technology to nested relational data and outlines a nested relational native way, as opposed to the SQL-based relational way, to implement entity providers for nested relational databases. Such entity providers are referred to as nested relational entity providers, as opposed to relational entity providers, in the following description.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
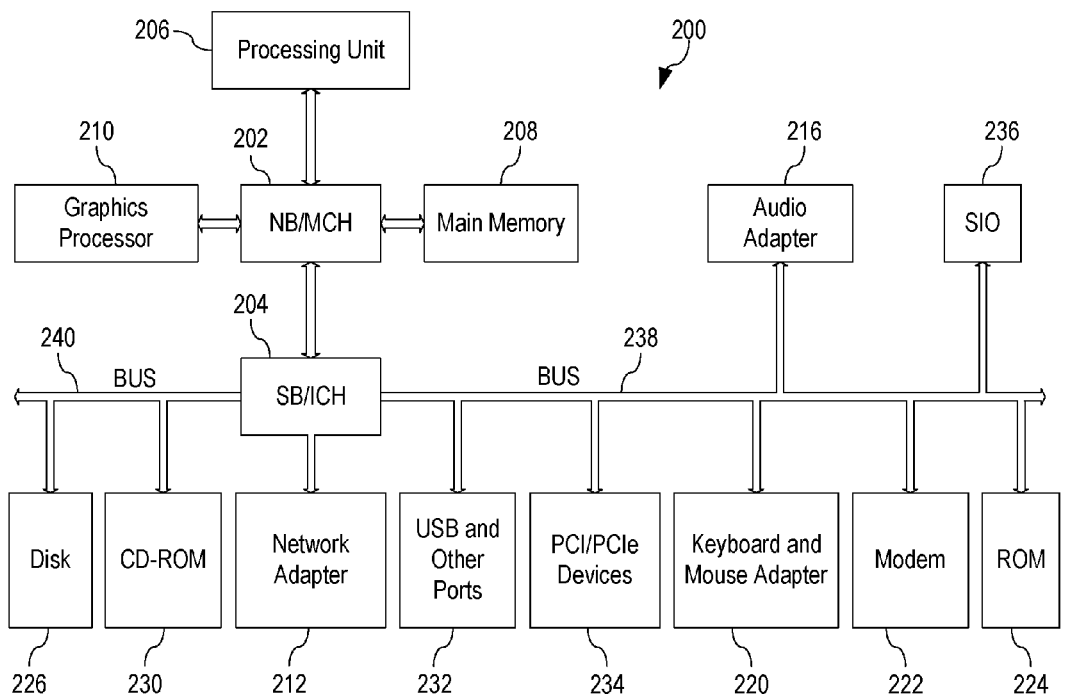
FIG. 2 is an example diagram of a data processing system environment in which exemplary aspects of the illustrative embodiments may be implemented.

The illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a distributed data processing system implementation, this is only an example and is not intended to state or imply any limitation with regard to the features of the present invention. To the contrary, the illustrative embodiments are intended to include stand-alone data processing environments and any other embodiments in which the mechanisms of the illustrative embodiments may be utilized to provide a mechanism for object-relational mapping (ORM) based data access for nested relational databases.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System P® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
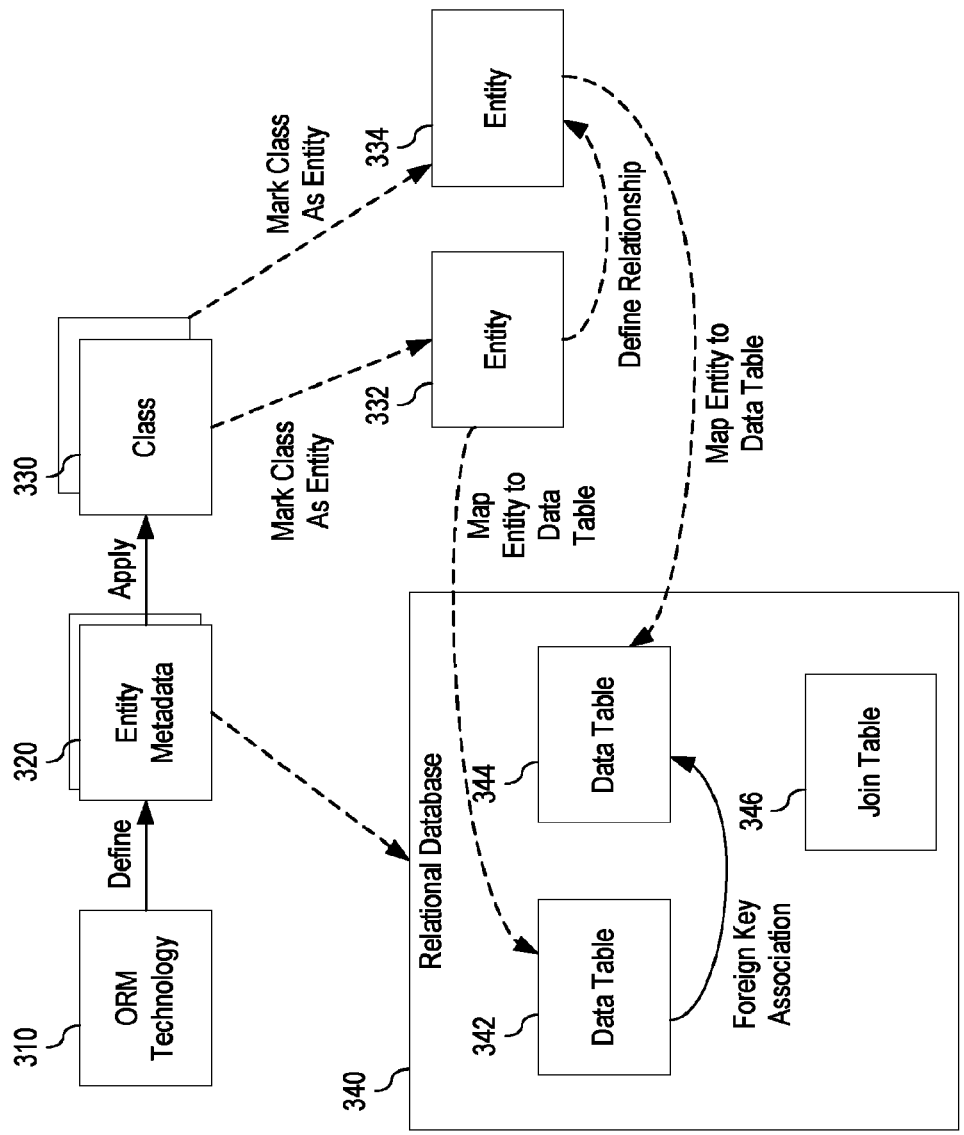
FIG. 3 is an example diagram of the use of an object-relational mapping (ORM) technology with a relational database.

FIG. 3 is an example diagram of the use of an object-relational mapping (ORM) technology with a relational database. As discussed above, ORM technologies, such as Java Persistence API (JPA) and .NET Entity Framework, for example, have been developed for solving the problem arising from the difference in modeling approaches used by database developers and application developers. For purposes of the following disclosure, it will be assumed that either a JPA or .NET Entity Framework ORM technology is being utilized as the ORM technology 310 of the illustrative embodiment, however it should be appreciated that the mechanisms of the illustrative embodiments are not limited to use with these two example ORM technologies. Rather, the mechanisms of the illustrative embodiments may be used with any other type of ORM technology, including Hibernate, for example, and others.

The ORM technology 310, e.g., JPA or .NET Entity Framework, defines a set of metadata 320, such as in the form of annotations, Extensible Markup Language (XML) mapping schema, or both, which can be applied to a regular Java™ or .NET class 330, for example, to mark it as an entity 332 and map the entity to a data table 342 in the database 340. "Marking" a class as an entity involves applying some form of metadata to the class (typically either code annotations to the class definition, or XML mapping metadata in an XML document external to the class, or the like) so that the ORM framework can recognize the class as being an entity and thus, capable of participating in the framework's persistence mechanisms. This so-called "entity metadata" 320, is also used to map the fields in the entity 332 to columns in a data table 342 as well as the relationship between two entities 332 and 334. Relationships between entities may be one of four types, one-to-one, many-to-one, one-to-many, and many-to-many, and may be unidirectional, if only one entity in the relationship can directly reference the other, or bi-directional if both entities in the relationship can directly reference the other.

Taking the JPA and .NET Entity Framework as example ORM technologies, in these ORM technologies an entity represents a record (or row) in a relational data table, e.g., data table 342. The relationship between two entity tables is realized through the "foreign key" mechanism in which one table 342 stores in its columns, the values of the primary key of the other table 344. In the case of unidirectional one-to-many relationships or a many-to-many relationship, a "join table" 346 has to be used because no single entity row can store multiple foreign keys to another entity table. Thus, three table data structures 342-346 must be utilized with such relationships.

Figure 4:
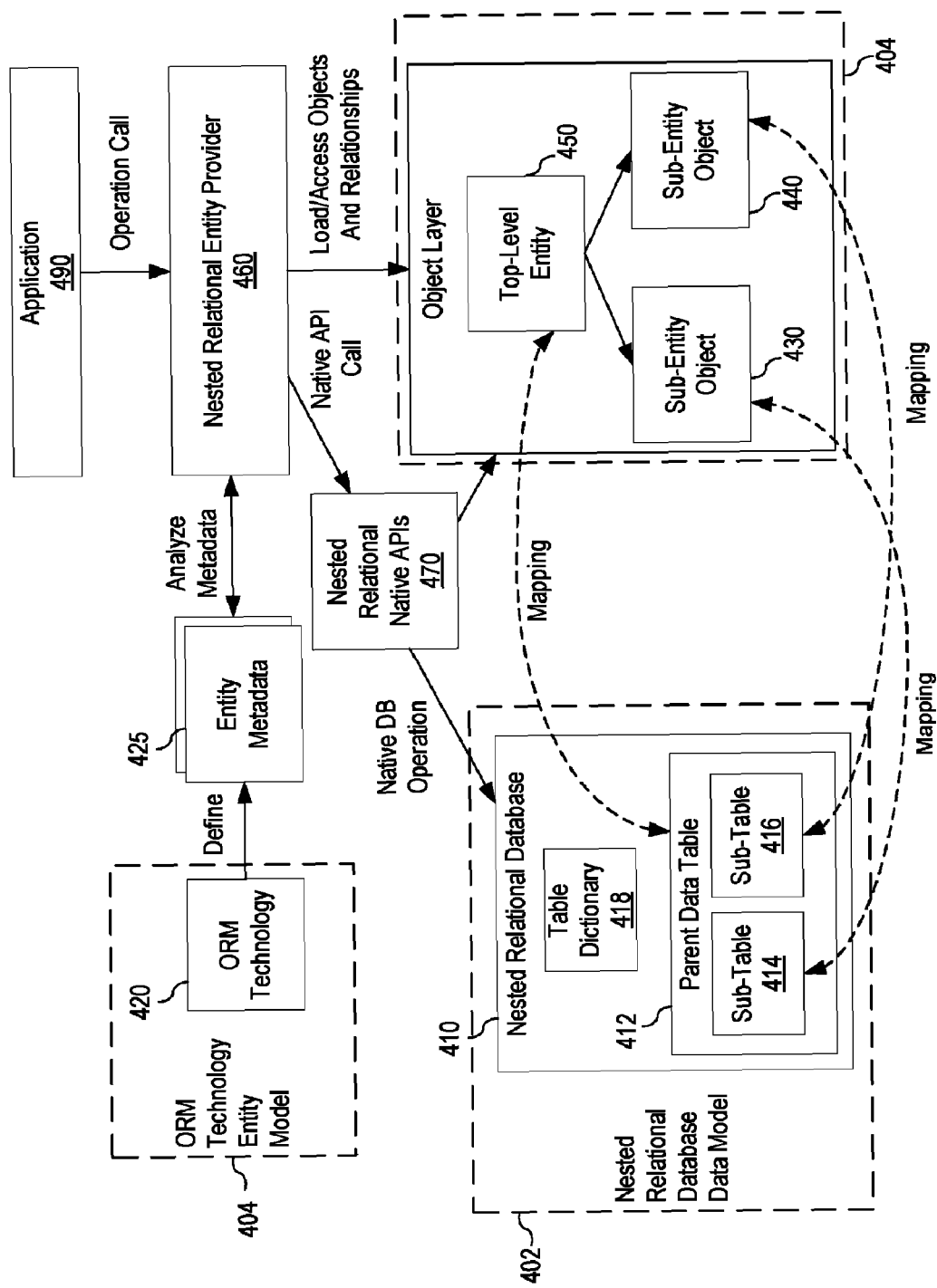
FIG. 4 is an example of the primary operational components according to one illustrative embodiment.

FIG. 4 is an example of the primary operational components according to one illustrative embodiment. In contrast to the relational database mechanism shown in FIG. 3, as shown in FIG. 4, one-to-many relationships (unidirectional or bi-directional) are built-in in the nested relational data model of a nested relational database 410, between the parent table 412 and its nested sub-tables 414-416, thus involving only one data table. This characteristic of nested relational data models makes nested relational databases especially efficient at managing one-to-many relationships in that the related entities are all contained in one data table record, eliminating the need to make multiple database reads to build the relationships between entities.

The illustrative embodiments use the entity metadata 425 defined in the ORM technology 420, e.g., JPA or .NET Entity Framework, to map the nested relational data of the nested relational database 410 to entities 430-450 and entity relationships without having to normalize the data first, i.e. flattening the data down to a non-nested, first normal form representation, and without introducing additional mapping metadata, such as nested relational specific annotation or XML mapping schema. Moreover, the illustrative embodiments provide a nested relational mechanism to implement a nested relational entity provider 460 that is able to reconcile the ORM technology entity model 404 and the nested relational database data model 402, especially the one-to-many relationship, and fully utilize more direct native APIs, as opposed to the SQL based mechanisms, to access nested relational data. As a result, the illustrative embodiments provide nested relational application developers with a standards-compliant ORM-based access technology that is fully nested relational aware and highly efficient.

With the mechanisms of the illustrative embodiments, each nested sub-table 414-416 in a nested relational database data model 402 is mapped as a separate entity 430, 440 and a one-to-many relationship is built between the parent entity 450, which it is nested within, and the sub-table entity 430, 440 itself. This one-to-many relationship can be unidirectional or bi-directional. This one-to-many relationship is referred to herein as a "nested one-to-many" relationship to distinguish it from the relational one-to-many relationship which involves at least two data tables, as shown in FIG. 3 described above. While the illustrative embodiments herein are described in terms of this "nested one-to-many" relationship, as an example, it should be appreciated that all entities 430-450 may have all four types of relationships to other entities.

With the illustrative embodiments, since no additional entity metadata is used to mark the "nested one-to-many" relationship, the nested relational entity providers 460 recognize such nested one-to-many relationships in the entity model 404 through introspection of the database schema in the nested relational database 410.

ORM Mapping for Nested Relational Data

The defining characteristic of the nested relational data model 402 of the nested relational database 410 is the ability to nest one or more sub-tables 414-416 within a table 412. The nested relational database 410 has a built in mechanism for defining the nesting of sub-tables 414-416 within a table 412. That is, the nested relational database 410 allows a field (column) to store multiple values. These fields are referred to as multi-value (MV) fields. The nested relational database 410 also permits "multi-sub-value" (MS) fields which store multiple "sub" values within a multi-value, thus presenting a three level nested data structure. These MV fields and MS fields are associated together to make a sub-table 414-416 within the parent table 412, in that the main table 412 may contain a sub-table 414 made of associated MV fields (a MV table), and a MV table 414 may contain a sub-table 416 made of associated MS fields.

To map a nested relational data model 402 to the entity model 404 defined by an ORM technology, e.g., JPA or .NET Entity Framework, the illustrative embodiments map all the tables 412-416, including sub-tables at different levels, to separate entities 430-450. The separate entities consist of a top level entity 450 mapped to the parent data table 412, and sub entities 430-440 mapped to sub tables 414-416, thereby defining a nested relational one-to-many relationship in the entity model, between the top level entity 450 and the sub entities 430-440. In the case of nested relational databases, unassociated MV/MS fields (MV/MS fields that are not part of a sub table, but are instead stand-alone lists of values) are simply mapped as an entity field of a collection type (Array, List, etc.) inside the entity which maps to the table or sub-table that contains these unassociated MV/MS fields.

Nested relational databases also have I-Type/V-type fields (I-imaginary, V-virtual) which are not associated with storage locations, but are nevertheless defined as fields in the database dictionary/schema. Such fields contain an expression or function defined on them that can be evaluated to a value or multiple values at run time. These fields can participate in the entity mapping as non-updatable entity fields. These "virtual" database fields can be mapped to properties on mapped objects in the same manner as regular (non-virtual) database fields. However, since virtual fields represent calculated values, rather then physically stored values, they are not updatable. Thus, they are mapped to read-only properties on the mapped objects.

With the illustrative embodiments, the nested one-to-many relationships between entities 430-450 have a cascade-type of ALL. This means that any operation, such as persist, update, delete, refresh, or merge will be cascaded from a parent entity 450 to its entire set of sub-entities 430-440 associated through the nested one-to-many relationship.

While the illustrative embodiments herein are described in terms of the nested one-to-many relationship, it should be appreciated that all entities 430-450, including sub-entities 430-440, may have all four types of relationships to other entities. It is, however, often more practical for the sub-entities 430-440 to have a unidirectional one-to-one or many-to-one relationship to other top-level entities, e.g., entity 450, because in many cases only top-level entities are uniquely identified, i.e. the entities have a unique key value, corresponding to a primary key in the database table, that can be used to retrieve the entity from the database, and thus, can be joined through the foreign key mechanism. Sub-entities may not necessarily be uniquely identifiable in this manner. That is, entities that are mapped to nested sub-tables, may not necessarily have a field that can be used to uniquely identify them. This is because nested relational databases do not require that nested items have a key field associated with them.

However, if the sub-entities 430-440 are uniquely identifiable, then there is nothing to prevent them from being associated with other entities in any of the four types of relationships. Entities that are mapped to a parent table are always able to be uniquely identified, because records in the parent table always contain a primary key value. Sub-entities, however, are mapped to sub-tables, and items in sub-tables do not necessarily have a key value that can uniquely identify them. If a sub-entity is mapped to a sub-table that does contain a key field, then instances of the sub-entity will be uniquely-identifiable. If, on the other hand, a sub-entity is mapped to sub-table that does not contain a field with unique values, then instances of the sub-entity will not be able to be uniquely identifiable.

The Nested Relational Entity Provider

The Nested relational entity provider 460 operates on a nested relational database 410 to generate the various entities 430-450 and entity relationships such that they can be loaded from the server or other computing device providing the nested relational database 410. The term "entity provider" here means a particular implementation of an ORM (Object Relational Mapping) framework. The term "nested relational entity provider" means an entity provider that can operate on a nested relational database in a native manner, as described above, wherein SQL and first normal form normalization of the data is not required by the entity provider. The loaded entities 430-450 and their entity relationships may then be used to access corresponding data in the nested relational database 410, such as in answer to queries or the like.

For example, the nested relational entity provider 460 for the nested relational database 410, in accordance with the mechanisms of the illustrative embodiments, automatically recognizes the nested one-to-many relationships between the entities 430-450. The "nesting-based" one-to-many relationships are automatically recognized by the nested relational entity provider 460 because the data is stored in the nested relational database 410 in nested form. Thus, by pulling a parent entity out of the nested relational database 410, the nested relational entity provider 460, in the same data operation, can automatically pull out all of the nested child entities as well. This nesting information is stored in the nested relational database schema or "dictionary" 418, which the nested relational entity provider 460 has access to and uses during database operations that involve retrieving or saving entities from and to the nested relational database 410.

In addition, the nested relational entity provider 460 also recognizes collection-typed fields that are mapped to non-associated MV/MS fields in the nested relational database 410. A nested relational database field that is defined in the database schema (dictionary) 418 as being a multi-value field, but does not belong to an association (also per the database schema, or dictionary), is said to be a non-associated multi-value field. This implies that the field contains a collection of values, but these values are not associated with any other multi-values in the table. In this case, the non-associated multi-value field is mapped to a collection in the object layer. For example, a non-associated multi-value field may contain a list of contact phone numbers (home phone, cell phone, work phone, etc.). This field would then get mapped to a collection of strings in the programming language used by the mapping framework. Thus, the nested relational entity provider 460 uses information from the nested relational database schema (dictionary) 418 to determine whether a given field (1) is multi-valued and (2) is not associated with other multi-values, and in this case maps the field to a collection in the mapped object.

The relative position of a sub-table entity 430-440 within its parent entity 450 is kept if it is significant to the application. The application developer may inform the nested relational entity provider 460, through a configuration mechanism, that the positional information of the sub-entities is important and should be kept. The term "kept" here means that the relative position of a sub-entity within its parent entity is the same as that of a sub-table record within its parent record in the nested relational database 410.

The nested relational database 410 supports client Application Program Interfaces (APIs) in the ORM technology being utilized that read and write to the nested relational database 410 directly without the need to normalize (flatten) the /nested data and without going through a SQL engine, even if the SQL engine is supported by the nested relational database 410. That is, the nested relational database 410 has one or more "native" APIs that allow very efficient access to the data in the database 410. These native APIs do not use SQL, as SQL typically requires normalizing the data in the nested relational database 410 before it can be accessed. This normalization involves "flattening" ("unnesting") of the nested data to first normal form (1NF), which is an overhead that can lead to inefficiencies. Such client APIs are referred to herein as "nested relational native APIs," 470 as opposed to the SQL-based APIs such as JDBC, ODBC, ADO.NET, etc.

Nested relational native APIs 470 are able to perform read/write operations on a record basis or on a record-group basis, which is ideal for bulk operations. Such nested relational native APIs 470 also support executing nested relational native query languages by sending the query commands to the nested relational database 410 and fetching the query result from the nested relational database 410. That is, the nested relational database 410 has a "native" query language. Just as the native API is typically not SQL, this native query language is also typically not SQL. Thus, the nested relational entity provider 460 allows programmers to issue queries to the nested relational database 410 in this "native" query language.

Entity Loading

When called to load entities, a relational entity provider uses SQL commands directly or indirectly through SQL-based APIs, such as JDBC or ADO.NET providers, to fetch the needed data from the server. However, for a nested relational entity provider 460, in accordance with the mechanisms of the illustrative embodiments, it is much more efficient to use the nested relational native APIs 470 to retrieve the needed data from the nested relational database 410. For example, IBM UniData and IBM UniVerse have the UniObjects for Java API for the Java platform and the UniObjects for .NET API for the .NET platform. Both of these APIs access the IBM UniData and IBM UniVerse databases in a native, highly efficient manner. The illustrative embodiments utilize such APIs to allow the nested relational database 410 to participate as a backend data store that uses nested relational-native API's rather than SQL-based APIs for the sake of performance improvement.

The loading of a top-level entity, e.g., parent entity 450, results in the automatic recursive loading of all the entities, e.g., sub-entities 430-440, associated through every nested one-to-many relationship. This is performed due to these entities actually being contained in a single nested relational data record (row). That is, since the parent entity and all of its sub-entities can be retrieved in a single read of a nested relational database 410 record, it is natural to load all of the parent's sub-entities when the parent itself is loaded. This is the default behavior in this particular implementation of the illustrative embodiments. However, as described hereafter, the illustrative embodiments further support "lazy-loading" of sub-entities if such "lazy-loading" is determined to provide better performance under certain conditions.

The ORM technology utilized by the particular implementation may support lazy-loading to achieve better performance. Lazy-loading basically means that the nested relational entity provider 460 may delay the actual loading of a field or an associated entity 430-440 until it is actually accessed by the application. A user may mark an entity field, i.e. a property on a mapped object that maps to a database field, as lazy-loading if he/she thinks that field most likely will not be accessed, so as to reduce the up-front overhead. This "marking" as a lazy-loading entity field is done with the mapping metadata of the framework either through code annotations on the field to be marked as lazy-loaded, through an XML mapping document, or the like. The nested relational entity provider 460, however, may ignore such indications, depending on the implementation, for all the nested one-to-many relationships. One reason for the lazy-loading directive in an ORM framework is to avoid the overhead of unnecessary database reads across multiple database tables. A database read might be "unnecessary" if the data that is read is used to load entity fields that are not needed in a particular scenario (e.g., sometimes only a subset of the fields of an entity are needed, depending on the circumstances). This particular overhead, however, i.e. that of performing potentially unnecessary reads across multiple tables, is not as much of a concern in the case of nested relational databases where the other tables are actually just sub-tables on the main table. This is because a single database read of a nested relational database record pulls in the entire data of the nested relational database record, including the data stored in the sub-tables of the particular record. For this reason, a particular implementation of a nested relational entity provider 460 may ignore a lazy-loading directive on an entity field that maps to a sub-table in the nested relational database 410.

For performance reasons, a nested relational entity provider 460 may assume that relationships, except the nested one-to-many relationship, are by default to be lazily loaded. This is because nested relational database 410 may not have a native "join" operation like SQL's join operation, which can load data from multiple data tables within one database operation. That is, since the nested relational database 410 may not have a native JOIN operation across separate tables (which would allow a single database call to pull in information from multiple "joined" tables), the nested database 410 uses multiple database reads to pull in all of the necessary joined data, i.e. the equivalent of a JOIN is essentially done in multiple database operations. This can lead to inefficiencies, and thus, a nested relational entity provider 460 may choose to default to lazy-loading of entity fields that get their data from tables other than the main table. If a nested relational database does support a "join" operation natively, then the nested relational entity provider 460 may "eagerly" load, i.e. not use lazy loading, these data comprising these relationships to save a call to the database.

The nested relational entity provider 460 may or may not support the separate loading of individual sub-entities 430-440. If a nested relational entity provider 460 does not support the separate loading of individual sub-entities, then all sub-entities 430-440 must be loaded through the loading of the top-level entity, e.g., parent entity 450. Such a decision may be performed in a case where sub-entities 430-440 generally do not have separate identifiers and are not uniquely identifiable, i.e. the parent-child relationship is determined just from the fact that the sub-table is embedded in the parent table. However, if there is a workable way to identify sub-entities 430-440 in the database, a nested relational entity provider 460 may support the separate loading of individual sub-entities 430-440. For example, one workable manner for identifying sub-entities 430-440 may be via a key field being available on the sub-table that allows individual sub-entities to be uniquely identified. Another possible mechanism is, in the absence of an individual key field being available, to use a combination of fields to uniquely identify a sub-entity, in which case this combination of fields might be used to retrieve individual sub-entities. A further possible mechanism is, in the case that the semantics of the application allows any sub-entity that matches a set of criteria to serve as a suitable sub-entity instance for the situation, to use the criteria to pull any matching sub-entity separately, even if such a sub-entity is not unique in the sub-table.

The ORM technology, such as JPA or .NET Entity Framework, utilized with the mechanisms of the illustrative embodiments has a database-independent, entity-based query language. For JPA, for example, this entity-based query language is the Java Persistence Query Language (JPQL). For the .NET Entity Framework, the entity-based query language is the Entity SQL. In the known relational database systems, these entity-based query languages are actually translated into non-entity based SQL by the relational entity providers at runtime before being applied to data of the relational database.

The nested relational entity provider 460 may support JPQL, Entity SQL, or another entity-based query language, either in their entirety, or with some limitations by translating at runtime these query languages into native nested relational query commands, thus avoiding the data normalization (flattening) requirement which is necessary for standard SQL support.

In addition, the nested relational entity provider 460 may also choose to support native queries directly (as contrasted to queries in the ORM's entity-based query language) if the ORM technology framework specification allows it. JPA, for example, supports a native query concept (although this native query is really SQL), which means the query command goes directly, without translation, to the database and works directly on the data in the database instead of on the entities. The nested relational entity provider 460 makes use of such facilities to support nested relational native query language instead of SQL through the nested relational native APIs, which offers better performance in addition to returning nested query results for efficient loading of entities and the nested one-to-many relationships. For example, depending on the ORM framework, there is often a facility, typically via an ORM framework API call, to make direct "native" queries to the data store. This use of native queries is often in contrast to how an ORM framework might typically work, where an ORM-framework-specific query may be more typically used to retrieve data from the database. JPQL is an example of such an ORM-framework-specific query language. The nested relational entity provider 460 may also support native queries only, without supporting the entity query language at all.

Entity Persisting

With the nested relational entity provider 460 of the illustrative embodiments, in general, any Create, Read, Update, and Delete (CRUD) operation on a top-level entity, e.g., parent entity 450, cascades to all its sub-entities, e.g., sub-entities 430-440, through the nested one-to-many relationship for the reason that all of the sub-entities 430-440 reside in the same record in the nested relational database 410. The CRUD operations on a sub-entity 430-440 may be handled differently for different operations, however.

For example, when an application calls a persist operation to persist a top-level entity 450, the nested relational entity provider 460 cascades this operation through all of the top-level entity's nested one-to-many relationships recursively. A nested relational entity provider 460 may choose not to support sub-entities to be persisted on their own, even if they can be uniquely-identified, and instead allow them only to be persisted in the context of their parent entity. 450. This may be an implementation choice in that it may be possible to write sub-entities back separately from the parent entity (if the sub-entities can be uniquely identified). However, in general, nested relational database operations are performed on a record-level basis, as opposed to a field-level basis and, in doing a record-level write, both the main parent entity and the sub-entities are all written out at the same time in that single write operation.

If the saving of individual sub-entities is not supported, then when the nested relational entity provider 460 receives a request, e.g., a call of a persist operation, from an application 490 to persist a sub-entity 430-440, the nested relational entity provider 460 may choose to either ignore such a request from the application 490 or throw an exception. Alternatively, the nested relational entity provider 460 may attempt to find the top-level entity 450 which this sub-entity 430-440 is nested within, e.g., through a reference in the sub-entity to its parent entity, and persist the top-level entity 450 instead, which will eventually cascade to this sub-entity 430-440.

As another example, when an application 490 calls an update operation to update a top-level entity 450, the nested relational entity provider 460 cascades the update operation to all its sub-entities 430-440 through the nested one-to-many relationships recursively. This means that all changes made to all these entities 430-450 will be picked up and written to the nested relational database 410.

When an application 490 calls an update operation to update a sub-entity 430-440, the nested relational entity provider 460 checks if this sub-entity 430-440 is still nested within a top-level entity 450. This check is performed because an application 490 can sever the nested one-to-many relationship of a sub-entity 430-440 by simply removing it from the collection-typed field in the parent entity 450 that holds the references to all the sub-entities 430-440. It should be noted that sub-entities are stored in a collection-type field as a collection of the objects they are mapped to. For example, consider a parent entity of "Customer" with a one-to-many relationship with a set of sub-entity "Orders." In this case, the orders are stored in a collection of type "Orders."

If the sub-entity 430-440 is still nested within a top-level entity 450, the nested relational entity provider 460 updates the top-level entity 450 instead which causes the update operation to cascade down to the sub-entity 430-440. If the sub-entity 430-440 is not nested within a top-level entity 450, the nested relational entity provider 460 may choose to ignore the application's request or simply throw an exception. Alternatively, if the sub-entity 430-440 is uniquely identifiable in the nested relational database 410, the nested relational entity provider 460 may directly update the sub-entity 430-440 in the nested relational database 410. Furthermore, the nested relational entity provider 460 may not support direct update operations on a sub-entity 430-440 at all and thereby force applications 490 to always start the update from a top-level entity 450.

With regard to the application 490 calling delete operations, the nested relational entity provider 460 cascades delete operations on a top-level entity 450 to all of its sub-entities 430-440 through the nested one-to-many relationships. To delete a sub-entity 430-440, the nested relational entity provider 460 checks if this sub-entity 430-440 is still nested within a top-level entity 450. If so, it removes the sub-entity 430-440 from the nested one-to-many relationship it belongs to and then performs an update on the top-level entity 450. If the sub-entity 430-440 is not still nested within a top-level entity 450, the nested relational entity provider 460 may ignore such a delete request or simply throw an exception. However, if the sub-entity is able to be uniquely identified in the database, then the nested relational entity provider implementation may choose to support the direct deletion of the sub-entity.

With a lock operation to lock individual rows or a sub-table, unless the nested relational database 410 supports such locks, a lock attempt on a sub-entity 430-440 may be either ignored by the nested relational entity provider 460 or result in an exception being thrown by the nested relational entity provider 460. If locks are supported by the nested relational database 410, then the lock is applied to the sub-table row or rows.

For performance and scalability reasons, optimistic transactions are the standard transaction mode used by the ORM technology employed by the illustrative embodiments, e.g., JPA or .NET Entity Framework. What this means is that no lock will be placed on the data in the nested relational database 410 during the life-span of the transaction. As a result, other transactions may access and even change the same data. At the transaction commit time, if an update of the data is required, the nested relational entity provider 460 checks to see if the data has been changed by other transactions. If the data has been changed by other transactions, the nested relational entity provider 460 either throws an exception or requests that the application 490 choose whether to override the changes in the nested relational database 410 or roll-back the current transaction.

As described above, since an update of a non-uniquely-identifiable sub-entity, if supported, goes through the top-level entities, the nested relational entity provider 460 may choose to perform a concurrent update check on the top-level entity 450. This means that even concurrent changes to the top-level entity 450 that are otherwise irrelevant to the sub-entity 430-440 will cause an optimistic transaction failure, i.e. resulting in either an exception, an override of the changes in the database, or a roll-back of the current transaction. As this may be viewed as a limitation by certain types of applications, the nested relational entity provider 460 may only check for concurrent changes to the particular sub-entity 430-440. If a sub-entity 430-440 is uniquely identifiable in the nested relational database 410 and the nested relational entity provider 460 chooses to support direct update or delete of it, a concurrent update check limited in scope only to the sub-entity 430-440 may be performed.

Thus, the illustrative embodiments provide a mechanism for enabling ORM technologies to be applied to nested relational databases by providing a nested relational entity provider that generates entities based on tables and sub-tables, as defined by multi-value fields of the nested relational database, while keeping the relationships between tables and sub-tables by representing them as relationships between entities and sub-entities. These relationships may be one-to-one, one-to-many, many-to-many, or many-to-one relationships. The nested relational entity provider provides functionality for loading entities and performing persist (insert, update, delete) and query operations on the generated entities.

Figures 5, 6:
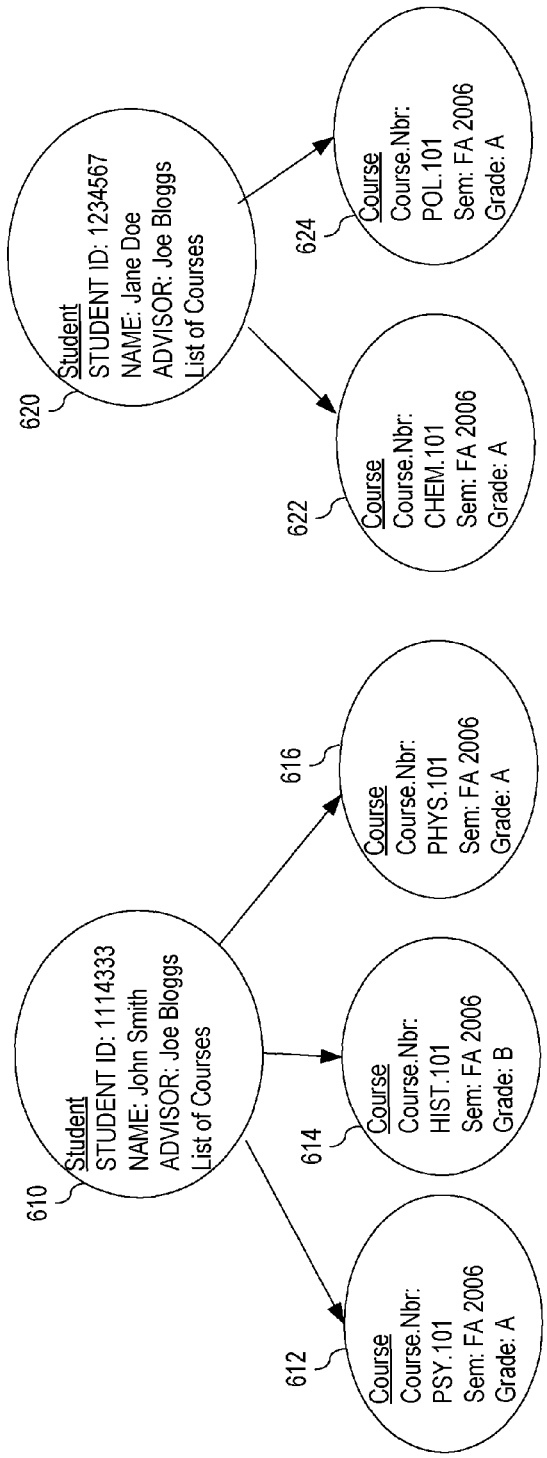
FIG. 5 is an example of a nested relational database table data structure in accordance with one example implementation of an illustrative embodiment.
FIG. 6 is an example diagram illustrating a set of objects, representing entities and associated sub-entities, that may be generated, based on the table 510 in FIG. 5, by the nested relational aware entity provider in accordance with one illustrative embodiment.

FIG. 5 is an example of a nested relational database table data structure in accordance with one example implementation of an illustrative embodiment. The database table 510 shown in FIG. 5 is just one table in possibly many table data structures, that make up a nested relational database. As shown in FIG. 5, the database table 510 is comprised of a plurality of records 520 and 530 with each record 520, 530 having a plurality of fields 521-526. Fields 521-523 are single value fields while fields 524-526 are multi-value (MV) fields.

In the depicted example, the database table 510 stores entries for students of a school. Each record 520, 530 stores information about the student including their identifier, name, advisor, course numbers, semesters that the courses were taken, and associated grade of each course taken. As shown, field 521 stores a unique identifier, or foreign key, referred to as the student's ID. Field 522 stores the student's name and field 523 stores the student's advisor name.

Field 524 stores a listing of the course numbers for the corresponding student. Thus, field 524 being a MV field, the field may store a plurality of values. Similarly, field 525 is a MV field storing a listing of a plurality of semester identifiers associated with the course numbers in field 524. Field 526 likewise stores a plurality of values for grades corresponding to the courses identified in the field 524. These three fields, associated together according to schema information stored in the table dictionary 580, comprise the Course sub-table 528.

The nested relational entity provider of the illustrative embodiments analyzes the table 510 and its table dictionary 580 and generates entities, sub-entities, and corresponding relationships between entities and sub-entities as objects and relationships between objects. Alternatively, a developer may choose to generate these entities and sub-entities and their relationships manually. The table 510 may have a table dictionary 580 which is metadata that describes the table 510. In particular the table dictionary 580 may specify the associations of columns or fields within the table 510. This table dictionary 580 may be analyzed by the nested relational entity provider to determine which columns in the table 510 are to be used as a basis for generating top-level entities, which columns identify sub-entities, which columns represent attributes of entities, and the like. The nested relational entity provider may take this information from the table dictionary 580 and use it to generate the entities and sub-entities along with the appropriate relationships and populate the entities with the data and information from the table 510.

FIG. 6 is an example diagram illustrating a set of objects, representing entities and associated sub-entities, that may be generated, based on the table 510 in FIG. 5, by the nested relational entity provider in accordance with one illustrative embodiment. As shown in FIG. 6, in generating the entities and sub-entities, a top-level entity (or parent entity) 610, 620 is generated for each student based on the student ID. These top-level entities have attributes corresponding to the data stored in the fields 521-523, i.e. student ID, name, and advisor.

These top-level entities 610, 620 further have a list of pointers to sub-entities 612-616 and 622-624 associated with the top-level entities 610, 620 via a one-to-many relationship. The sub-entities (or child entities) 612-616 and 622-624 are generated for each course associated with the particular student, represented by the top-level entities 610, 620. The sub-entities 612-616 and 622-624 have attributes corresponding to the information stored in fields 524-526, i.e. course number, semester, and grade. These sub-entities 612-616 and 622-624 may be generated for multi-value columns in the table 510 that are associated together, as specified in the table schema or dictionary 580. Thus, with the mechanisms of the illustrative embodiments, the various entities or objects are generated using a single table 510 rather than multiple tables as would be required in a standard relational database, i.e. a non-nested relational database.

Having generated the various entities 610-624, the nested relational entity provider handles operations on these objects taking into account the hierarchy and relationships between entities and sub-entities. As noted above, the nested relational entity provider may utilize nested relational native APIs to handle the performance of these operations. For example, with the loading of entities and sub-entities, using the entity 610 and sub-entities 612-616 as examples, the loading of the top-level student entity 610 results in the automatic recursive loading of all the course sub-entities 612-616 associated through the nested one-to-many relationship. If the nested relational entity provider does not support the separate loading of individual sub-entities, then all the course sub-entities 612-616 must be loaded through the loading of the top-level student entity 610. If a nested relational entity provider supports the separate loading of individual sub-entities, then the course sub-entities 612-616 could be loaded separately from the top-level student entity 610. Similar considerations apply to top-level student entity 620 and its corresponding sub-entities 622 and 624.

When an application calls a persist operation to persist the top-level student entity, such as top-level student entity 610, the nested relational entity provider cascades this operation through all of the top-level entity's nested one-to-many relationships recursively, i.e. to course sub-entities 612-616. In some implementations, the course sub-entities 612-616 can be persisted on their own. However, in some implementations, the course sub-entities 612-616 cannot be persisted on their own even if they can be uniquely identified and are persisted within the context of their parent student entity 610. Thus, when the nested relational entity provider receives a request from an application to persist a course sub-entity 612, the nested relational entity provider may choose to either ignore such a request from the application or throw an exception. Alternatively, the nested relational entity provider may attempt to find the top-level student entity 610 which this sub-entity 612 is nested within and persist the top-level student entity 610 instead, which will eventually cascade to this sub-entity 612. Such finding of the top-level student entity 610 can be performed by analyzing the relationships between objects 610 and 612 and the records of the table 510.

When an application calls an update operation to update the top-level student entity, such as top-level student entity 610, the nested relational entity provider cascades the update operation to all its course sub-entities 612-616 through the nested one-to-many relationships recursively. This means that all changes made to all these entities 610-616 will be picked up and written to the nested relational database.

When an application calls an update operation to update one of the course sub-entities 612-616, the nested relational entity provider checks if the sub-entity, e.g., sub-entity 612, is still nested within the top-level student entity 610. As noted above, an application can sever the nested one-to-many relationship of the sub-entity 612 by simply removing it from the collection-typed field that stores the references to sub-entities, i.e. the list of pointers to sub-entities, in the parent student entity 610. If the sub-entity 612 is still nested within a top-level student entity 610, the nested relational entity provider updates the top-level student entity 610 which causes the update operation to cascade down to the course sub-entity 612. If the course sub-entity 612 is not nested within a top-level student entity 610, the nested relational entity provider may choose to ignore the application's request or simply throw an exception. Alternatively, if the course sub-entity 612 is uniquely identifiable in the nested relational database, the nested relational entity provider may directly update the course sub-entity 612 in the nested relational database. Furthermore, the nested relational entity provider may not support direct update operations on the course sub-entity 612 at all and thereby force applications to always start the update from the top-level student entity 610.

If an application calls a delete operation on the top-level student entity 610, the nested relational entity provider cascades delete operations on the top-level student entity 610 to all of its course sub-entities 612-616 through the nested one-to-many relationships. To delete a course sub-entity, such as course sub-entity 612, the nested relational entity provider checks if this course sub-entity 612 is still nested within a top-level student entity 610. If so, it removes the course sub-entity 612 from the nested one-to-many relationship it belongs to and then performs an update on the top-level student entity 610. If the course sub-entity 612 is not still nested within a top-level student entity 612, the nested relational entity provider may ignore such a delete request or simply throw an exception. A nested relational entity provider may not support direct delete operations on course sub-entities 612-616 by either ignoring such a request or throwing an exception. Alternatively, if the entity provider is able to uniquely identify the sub-entity in the database, it may support direct deletion of the "disconnected" sub-entity.

Figure 7:
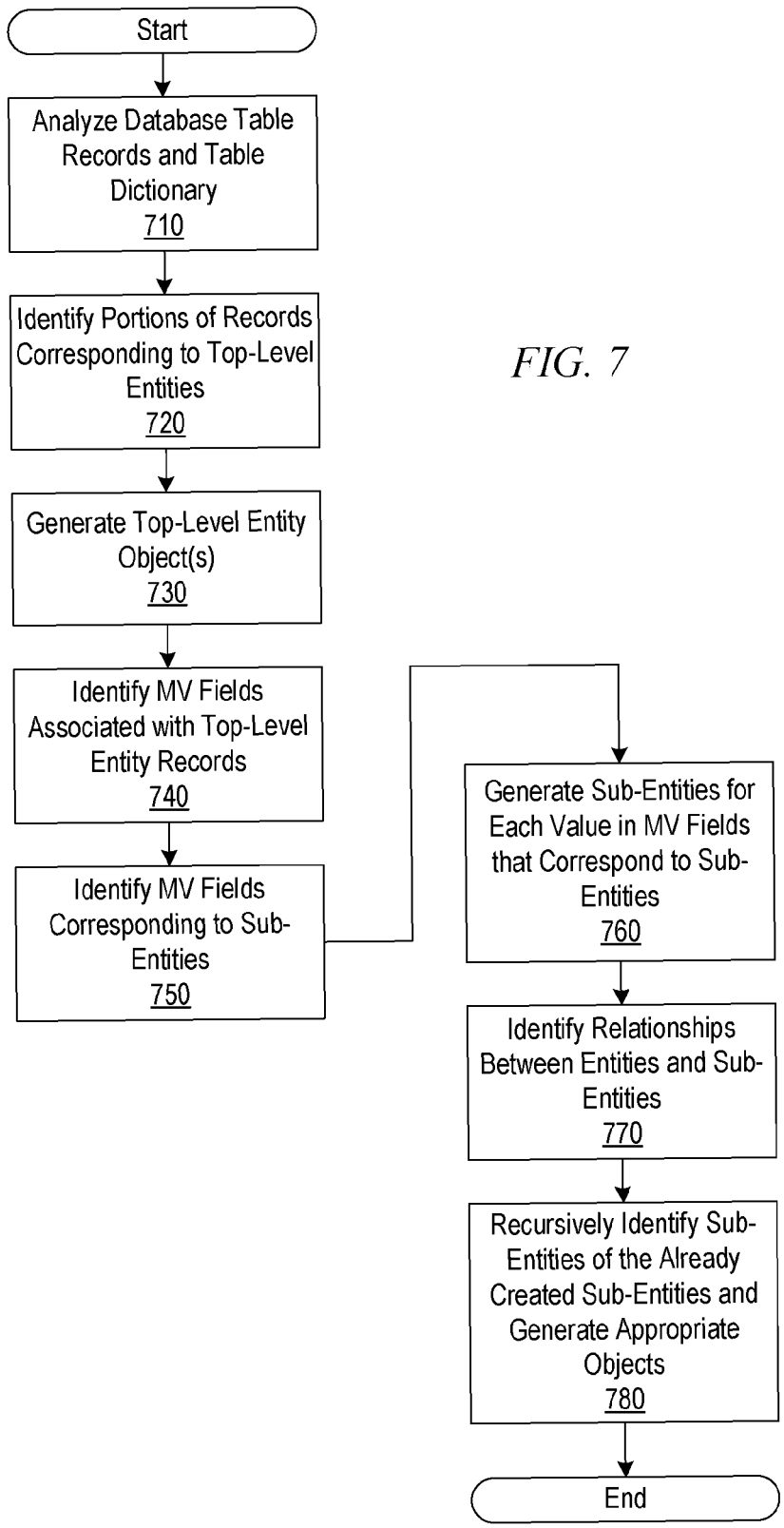
FIG. 7 is a flowchart outlining an example operation for generating entities and sub-entities for a nested relational database in accordance with one illustrative embodiment.

FIG. 7 is a flowchart outlining an example operation for generating, or instantiating, entities and sub-entities for a nested relational database in accordance with one illustrative embodiment. As shown in FIG. 7, the operation starts with the nested relational entity provider analyzing the records of a nested relational database table and the table dictionary (step 710). The nested relational entity provider identifies portions of the records corresponding to top-level entities (step 720). For each top-level entity identified, a top-level entity object is generated (instantiated) in an object layer corresponding to the nested relational database table (step 730). For each top-level entity identified, multi-value fields of the records corresponding to the top-level entity objects are identified, if any (step 740). For each multi-value field of each top-level entity object, a determination is made as to whether that multi-value field corresponds to a sub-entity of the top-level entity (step 750). Again, the table dictionary specifies the relationships between fields of records of the nested relational database table and thus, specifies the entities and their associated sub-entities. Thus, an analysis of the table dictionary identifies which fields are the basis for the generation of entity objects and sub-entity objects.

For each set of associated multi-value fields determined to be the basis for a sub-entity object, each individual set of associated values in the association is used to generate (instantiate) a separate sub-entity object (step 760). The relationship between the top-level entities and their corresponding sub-entity objects are identified in the object layer (step 770). For each sub-entity object, a recursive operation of determining whether there are additional sub-entities associated with these entities and generating corresponding sub-entity objects is performed (step 780). The operation then terminates.

Figure 8:
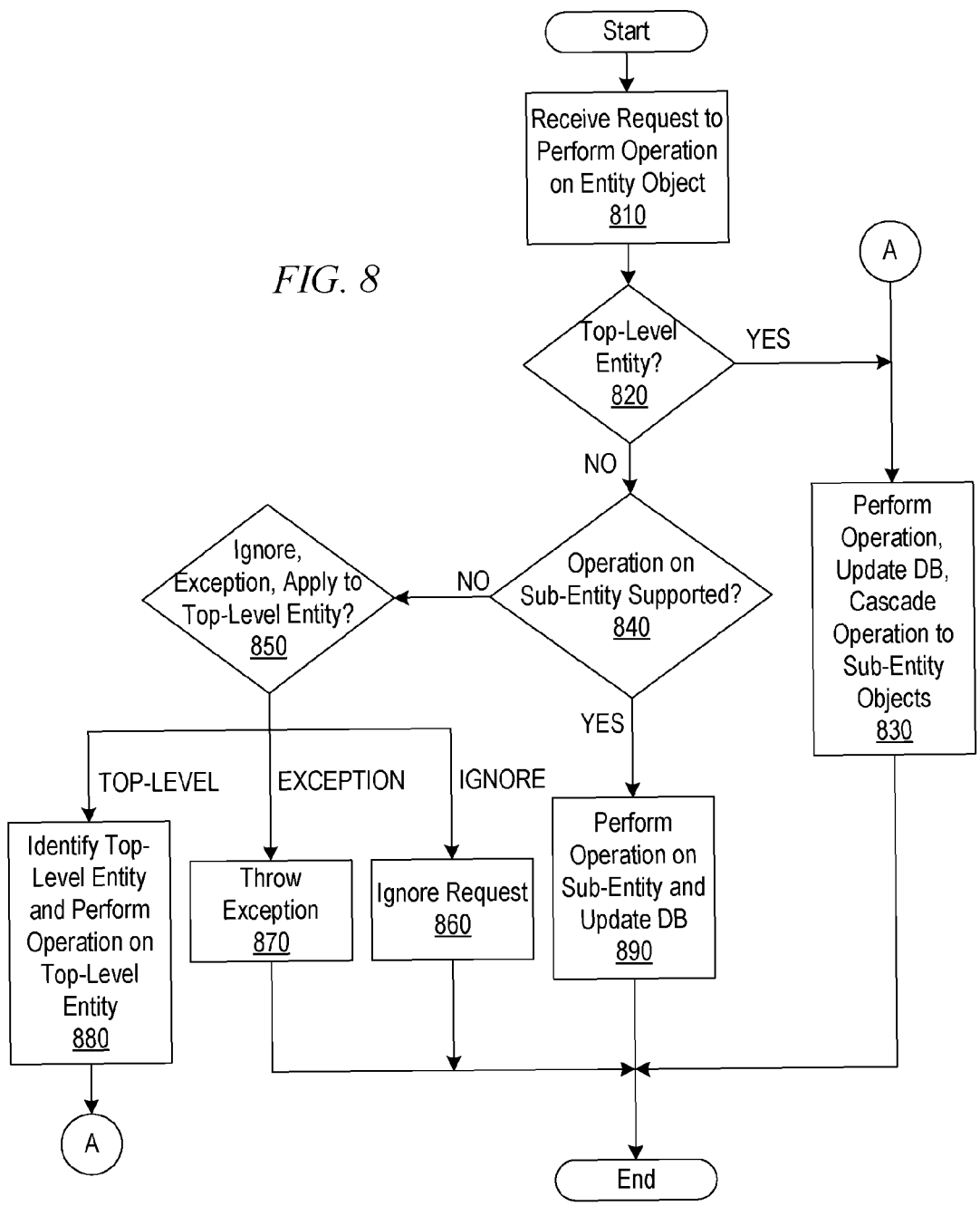
FIG. 8 is a flowchart outlining an example operation for performing an operation on an entity of a nested relational database in accordance with one illustrative embodiment.

FIG. 8 is a flowchart outlining an example implementation for performing an operation on an entity of a nested relational database in accordance with one illustrative embodiment. As shown in FIG. 8, the operation starts with receiving a request to perform an operation on an entity object (step 810). A determination is made as to whether the entity object is a top-level entity object (step 820). If the entity object is a top-level entity object, then the operation is performed, the nested relational database is updated, and the operation is cascaded to each of the sub-entities associated with the top-level entity via the relationships between the top-level entity and the sub-entities (step 830).

If the entity object is not a top-level entity object, then the entity object is a sub-entity object. A determination is made as to whether the nested relational entity provider supports the operation being performed separately on a sub-entity (step 840). If not, the nested relational entity provider determines whether to ignore the request for the operation, generate an exception, or identify the top-level entity object associated with the sub-entity object and apply the operation to the top-level entity object (step 850). Based on results of the determination, an appropriate operation is performed, e.g., ignoring the request (step 860), generating an exception (step 870), or identifying the top-level entity object (step 880) and then performing the operation on the top-level entity object and cascading the operation to any sub-entities of the top-level entity object (step 830).

If the nested relational entity provider supports the operation being performed separately on the sub-entity (step 840), the operation is performed on the sub-entity and the nested relational database is updated accordingly (step 890). Thereafter, or following steps 860 or 870 the operation terminates. Of course this operation may be performed repeatedly and recursively for the entity object upon which the request was received and other entity objects affected by the performance of the operation on the entity object specified in the request.

Thus, the illustrative embodiments provide mechanisms for mapping data stored in a nested relational database, without requiring first normal form normalization of the nested data, to objects and object-relationships in a programming language that utilizes object-oriented methodologies. With the mechanisms of the illustrative embodiments, industry-standard object-relational mappings, such as, but not limited to, those in the Java Persistence Architecture (JPA) and the .NET Entity Framework, are used to map the data in the nested relational database to the programming language objects and object relationships. No nested relational-specific metadata additions to the industry standard in question are required to achieve this mapping. The nested relational database's native data access API's, rather than SQL, are used to retrieve data from or save data to the nested relational database. Nested sub-tables in the nested relational database's data model are mapped as separate entities and a one-to-many relationship is built between the parent entity and its sub-entities if any.

It should be noted that, while the illustrative embodiments set forth above are directed to nested relational databases, the present invention is not limited to such. Rather, the mechanisms of the illustrative embodiments may be applied to other nested structure databases and nested structure database data models such as hierarchical databases and the like. Both nested relational databases and hierarchical databases are types of nested structure databases. The hierarchical databases use a hierarchical data model in which the data is organized into a tree-like structure that allows for repeating information using parent/child relationships: each parent can have many children but each child only has one parent. In the hierarchical data model, all attributes of a specific record are listed under an entity type. In hierarchical data models, the relationships between entities are explicitly defined through relationship definitions stored in the hierarchical database schema. For example, the relationships between tables representing entities must be explicitly defined by providing additional tables that specify the relationship relations. A separate join operation may be used to join the tables based on these defined relationships.

To the contrary, the nested relational databases use a model in which attributes of an entity are organized into tables and the tables are nested within one another, e.g., tables and sub-tables. With the nested relational database model, relationships between entities are implicit in the nesting of the tables. It is not necessary to explicitly define relationships between entities thereby eliminating the need for redundant relationship data.

With the mechanisms of the illustrative embodiments, if the database being operated on is a hierarchical database rather than a nested relational database, similar operations are performed but taking into account the hierarchical data model rather than the nested relational data model of the database. For example, when generating entities and sub-entities, the operation starts with the entity provider analyzing the records and schema of a hierarchical database. The entity provider identifies portions of the records corresponding to top-level entities. For each top-level entity identified, a top-level entity object is generated in the object layer. For each top-level entity identified, child entities corresponding to the top-level entity objects, and related to the top-level entity via a one-to-many relationship are identified, if any. The relationships between the top-level entities and their corresponding sub-entity objects are created in the object layer. For each sub-entity object, a recursive operation of determining whether there are additional sub-entities associated with these entities and generating corresponding sub-entity objects is performed.

With regard to performing an operation on an entity of a hierarchical database, the operation starts with receiving a request to perform an operation on an entity object. A determination is made as to whether the entity object is a top-level entity object. If the entity object is a top-level entity object, then the operation is performed, the hierarchical database is updated, and the operation is cascaded to each of the sub-entities associated with the top-level entity via the relationships between the top-level entity and the sub-entities.

If the entity object is not a top-level entity object, then the entity object is a sub-entity object. A determination is made as to whether the entity provider supports the operation being performed separately on a sub-entity. If not, the entity provider determines whether to ignore the request for the operation, generate an exception, or identify the top-level entity object associated with the sub-entity object and apply the operation to the top-level entity object. Based on results of the determination, an appropriate operation is performed, e.g., ignoring the request, generating an exception, or identifying the top-level entity object and sending a request to perform the operation on the top-level entity object. If the entity provider supports the operation being performed separately on the sub-entity, the operation is performed on the sub-entity and the hierarchical database is updated accordingly.

It should be noted that the primary difference between these operations of the illustrative embodiments being performed on a hierarchical database rather than a nested relational database is that, in many hierarchical databases, the relationships between the entities and sub-entities must be explicitly defined, such as in relationship tables, and that these definitions of relationships are used as a basis for determining top-level entities, sub-entities, parent entities, etc.

With the nested relational database discussed previously, these relationships are implicit in the nested tables and thus, a separate inquiry into the relationships between entities is not required.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, comprising:
   obtaining entity metadata constructs for an object relational mapping framework, the entity metadata constructs mapping fields in entities of an object model to fields in a data table of a nested relational database and identifying relationships between entities in the object model;
   obtaining a nested relational data model of the nested relational database, the nested relational data model specifying tables and sub-tables of the nested relational database;
   mapping tables and sub-tables of the nested relational database to a plurality of separate entities of the object model, wherein at least one parent table is mapped to at least one top-level entity and at least one sub-table is mapped to at least one sub-entity of the at least one top-level entity; and
   accessing data in the nested relational database using the plurality of separate entities, wherein:
   the mapping is performed without normalizing the data of the tables and sub-tables of the nested relational database to a non-nested representation,
   mapping tables and sub-tables of the nested relational database to a plurality of separate entities of the object model comprises providing a nested relational entity provider and using the nested relational entity provider to perform the mapping,
   the nested relational entity provider loads a top level entity and at least one sub-entity of the top level entity using a single read operation on a record of the nested relational database, and
   the record includes at least one multi-value field identifying at least one sub-entity.

2. The method of claim 1, wherein the at least one parent table has a nested one-to-many relationship to a plurality of sub-entities in the at least one sub-entity.

3. The method of claim 1, wherein the mapping is performed without introducing additional mapping metadata constructs to those used in the object relational mapping framework, for the purpose of mapping tables and nested sub-tables to a plurality of separate entities.

4. The method of claim 1, wherein the object relational mapping framework is one of a Java Persistence Architecture (JPA) object relational mapping framework or a .NET Entity Framework object relational mapping framework.

5. The method of claim 1, wherein accessing data in the nested relational database using the plurality of separate entities comprises using a native data access application program interface (API) of the nested relational database to directly access the data without use of an intervening query language engine.

6. The method of claim 1, wherein operations on an entity in the plurality of separate entities are cascaded down to all sub-entities below the entity in accordance with relationships between the entity and the sub-entities.

7. A computer program product comprising a computer readable storage medium having a computer readable program stored thereon, wherein the computer readable program, when executed on a computing device, causes the computing device to:
   obtain entity metadata constructs for an object relational mapping framework, the entity metadata constructs mapping fields in entities of an object model to fields in a data table of a nested relational database and identifying relationships between entities in the object model;
   obtain a nested relational data model of the nested relational database, the nested relational data model specifying tables and sub-tables of the nested relational database;
   map tables and sub-tables of the nested relational database to a plurality of separate entities of the object model, wherein at least one parent table is mapped to at least one top-level entity and at least one sub-table is mapped to at least one sub-entity of the at least one top-level entity; and
   access data in the nested relational database using the plurality of separate entities, wherein:
   the mapping is performed without normalizing the data of the tables and sub-tables of the nested relational database to a nested representation,
   mapping tables and sub-tables of the nested relational database to a plurality of separate entities of the object model comprises providing a nested relational entity provider and using the nested relational entity provider to perform the mapping,
   the nested relational entity provider loads a top level entity and at least one sub-entity of the top level entity using a single read operation on a record of the nested relational database, and
   the record includes at least one multi-value field identifying at least one sub-entity.

8. The computer program product of claim 7, wherein the at least one parent table has a nested one-to-many relationship to a plurality of sub-entities in the at least one sub-entity.

9. The computer program product of claim 7, wherein the computer readable program causes the computing device to perform the mapping without introducing additional mapping metadata constructs to those used in the object relational mapping framework, for the purpose of mapping tables and nested sub-tables to a plurality of separate entities.

10. The computer program product of claim 7, wherein the object relational mapping framework is one of a Java Persistence Architecture (JPA) object relational mapping framework or a .NET Entity Framework object relational mapping framework.

11. The computer program product of claim 7, wherein the computer readable program causes the computing device to access data in the nested relational database using the plurality of separate entities by using a native data access application program interface (API) of the nested relational database to directly access the data without use of an intervening query language engine.

12. An apparatus, comprising:
a processor; and
a memory coupled to the processor, wherein the memory comprises instructions which, when executed by the processor, cause the processor to:
obtain entity metadata constructs for an object relational mapping framework, the entity metadata constructs mapping fields in entities of an object model to fields in a data table of a nested relational database and identifying relationships between entities in the object model;
obtain a nested relational data model of the nested relational database, the nested relational data model specifying tables and sub-tables of the nested relational database;
map tables and sub-tables of the nested relational database to a plurality of separate entities of the object model, wherein at least one parent table is mapped to at least one top-level entity and at least one sub-table is mapped to at least one sub-entity of the at least one top-level entity; and
access data in the nested relational database using the plurality of separate entities, wherein:
the mapping is performed without normalizing the data of the tables and sub-tables of the nested relational database to a non-nested representation,
mapping tables and sub-tables of the nested relational database to a plurality of separate entities of the object model comprises providing a nested relational entity provider and using the nested relational entity provider to perform the mapping,
the nested relational entity provider loads a top level entity and at least one sub-entity of the top level entity using a single read operation on a record of the nested relational database, and
the record includes at least one multi-value field identifying at least one sub-entity.

13. The apparatus of claim 12, wherein the at least one parent table has a nested one-to-many relationship to a plurality of sub-entities in the at least one sub-entity.

14. The apparatus of claim 12, wherein the instructions cause the processor to perform the mapping without introducing additional mapping metadata constructs to those used in the object relational mapping framework, for the purpose of mapping tables and nested sub-tables to a plurality of separate entities.

15. The apparatus of claim 12, wherein the object relational mapping framework is one of a Java Persistence Architecture (JPA) object relational mapping framework or a .NET Entity Framework object relational mapping framework.

16. The apparatus of claim 12, wherein the instructions cause the processor to access data in the nested relational database using the plurality of separate entities by using a native data access application program interface (API) of the nested relational database to directly access the data without use of an intervening query language engine.

17. A method, in a data processing system, comprising:
obtaining entity metadata constructs for an object relational mapping framework, the entity metadata constructs mapping fields in entities of an object model to fields in a data table of the nested structure database and identifying relationships between entities in the object model;
obtaining a nested structure data model of the nested structure database, the nested structure data model specifying tables of the nested structure database;
mapping tables of the nested structure database to a plurality of separate entities of the object model, wherein at least one first table is mapped to at least one top-level entity and at least one second table is mapped to at least one sub-entity of the at least one top-level entity; and
accessing data in the nested structure database using the plurality of separate entities, wherein:
the mapping is performed without normalizing the data of the tables of the nested structure database,
mapping tables of the nested relational database to a plurality of separate entities of the object model comprises providing a nested relational entity provider and using the nested relational entity provider to perform the mapping,
the nested relational entity provider loads a top level entity and at least one sub-entity of the top level entity using a single read operation on a record of the nested relational database, and
the record includes at least one multi-value field identifying at least one sub-entity.

18. The method of claim 17, wherein the nested structure database is a hierarchical database, and wherein the nested structure data model is a hierarchical database data model.

* * * * *